(12) United States Patent
Lee et al.

(10) Patent No.: US 10,512,089 B2
(45) Date of Patent: Dec. 17, 2019

(54) METHOD AND APPARATUS FOR DETERMINING TRANSMISSION RESOURCE AND TRANSMISSION POWER IN WIRELESS COMMUNICATION SYSTEM

(71) Applicant: Samsung Electronics Co., Ltd., Gyeonggi-do (KR)

(72) Inventors: Nam-Jeong Lee, Suwon-si (KR); Sung-Ho Chae, Seoul (KR); Cheol Jeong, Seongnam-si (KR); Jae-Won Kim, Seoul (KR); Jeong-Ho Park, Seoul (KR); Jae-Weon Cho, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 154 days.

(21) Appl. No.: 15/532,495

(22) PCT Filed: Dec. 1, 2015

(86) PCT No.: PCT/KR2015/012999
§ 371 (c)(1),
(2) Date: Oct. 31, 2017

(87) PCT Pub. No.: WO2016/089087
PCT Pub. Date: Jun. 9, 2016

(65) Prior Publication Data
US 2018/0049180 A1    Feb. 15, 2018

(30) Foreign Application Priority Data
Dec. 1, 2014  (KR) .................. 10-2014-0170067

(51) Int. Cl.
*H04W 72/04*     (2009.01)
*G01S 5/02*      (2010.01)
(Continued)

(52) U.S. Cl.
CPC ..... *H04W 72/048* (2013.01); *H04W 72/0453* (2013.01); *H04W 72/0473* (2013.01)

(58) Field of Classification Search
CPC ............. H04W 72/048; H04W 52/346; H04W 52/283; H04W 72/0473; H04W 72/0453;
(Continued)

(56) References Cited

U.S. PATENT DOCUMENTS

| 2004/0258012 | A1* | 12/2004 | Ishii | H04L 47/10 370/328 |
| 2006/0155826 | A1* | 7/2006 | Hyun | G01S 5/021 709/218 |

(Continued)

FOREIGN PATENT DOCUMENTS

| KR | 20080030791 A | 4/2008 |
| WO | 2014049326 A1 | 4/2014 |

*Primary Examiner* — Kiet Tang

(57) ABSTRACT

The present disclosure relates to a communication technique for combining a 5G communication system that supports higher data transmission rates after 4G systems with IoT technology and to the system therefor. The present disclosure can be applied for intelligent services based on 5G communication technology and IoT related technology (for example, smart homes, smart buildings, smart cities, smart cars or connected cars, healthcare, digital education, retail businesses, security and safety related services, and the like). A method for determining an uplink transmission resource of a wireless communication system comprises the steps of: obtaining one or more of first distance information between a first base station supporting a first communication system and a terminal supporting the first communication system, and second distance information between a second base station supporting a second communication system and the terminal; and determining a frequency resource and transmission power for uplink signal transmission of the first
(Continued)

terminal based on one or more of the obtained first distance information and second distance information.

12 Claims, 8 Drawing Sheets

(51) Int. Cl.
*H04W 72/08* (2009.01)
*H04L 5/00* (2006.01)
*H04L 12/801* (2013.01)

(58) Field of Classification Search
CPC ............. H04W 52/242; H04W 52/383; H04W 52/146
See application file for complete search history.

(56) References Cited

U.S. PATENT DOCUMENTS

| | | | |
|---|---|---|---|
| 2008/0081626 A1* | 4/2008 | Choi | H04B 7/155 455/442 |
| 2008/0232320 A1 | 9/2008 | Lee et al. | |
| 2012/0099467 A1* | 4/2012 | Yamazaki | H04W 72/08 370/252 |
| 2013/0064131 A1* | 3/2013 | Kwon | H04L 5/0007 370/252 |
| 2013/0288732 A1* | 10/2013 | Beale | H04L 47/12 455/509 |
| 2014/0064067 A1 | 3/2014 | Drewes et al. | |
| 2014/0094204 A1 | 4/2014 | Dimou et al. | |
| 2014/0314048 A1 | 10/2014 | Yi et al. | |

* cited by examiner

METHOD AND APPARATUS FOR DETERMINING TRANSMISSION RESOURCE AND TRANSMISSION POWER IN WIRELESS COMMUNICATION SYSTEM

CROSS-REFERENCE TO RELATED APPLICATION(S) AND CLAIM OF PRIORITY

The present application is related to and claims priority under 35 U.S.C. § 365 to International Patent Application No. PCT/KR2015/012999 filed Dec. 1, 2015, entitled "METHOD AND APPARATUS FOR DETERMINING TRANSMISSION RESOURCE AND TRANSMISSION POWER IN WIRELESS SYSTEM", and, through International Patent Application No. PCT/KR2015/012999, under 35 U.S.C. § 119(a) to Korean Patent Application No. 10-2014-0170067 filed Dec. 1, 2014, each of which are incorporated herein by reference into the present disclosure as if fully set forth herein.

TECHNICAL FIELD

The present disclosure relates to methods and apparatuses for determining uplink transmit resources and transmit power in wireless communication systems.

BACKGROUND

In order to meet the demand for wireless data traffic soaring since the 4th generation (4G) communication system came to the market, there are ongoing efforts to develop enhanced 5th generation (5G) communication systems or pre-5G communication systems. For the reasons, the 5G communication system or pre-5G communication system is called the beyond 4G network communication system or post LTE system.

For higher data transmit rates, 5G communication systems are considered to be implemented on ultra-high frequency bands (mmWave), such as, e.g., 60 GHz. To mitigate pathloss on the ultra-high frequency band and increase the reach of radio waves, the following techniques are taken into account for the 5G communication system: beamforming, massive multi-input multi-output (MIMO), full dimensional MIMO (FD-MIMO), array antenna, analog beamforming, and large scale antenna.

Also being developed are various technologies for the 5G communication system to have an enhanced network, such as evolved or advanced small cell, cloud radio access network (cloud RAN), ultra-dense network, device-to-device (D2D) communication, wireless backhaul, moving network, cooperative communication, coordinated multi-point (CoMP), and interference cancellation.

There are also other various schemes under development for the 5G system including, e.g., hybrid FSK and QAM modulation (FQAM) and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access schemes.

Meanwhile, the Internet is evolving from the human-centered connection network by which humans create and consume information to the Internet of Things (IoT) network by which information is communicated and processed between things or other distributed components. The Internet of Everything (IoE) technology may be an example of a combination of the Big data processing technology and the IoT technology through, e.g., a connection with a cloud server.

To implement the IoT, technology elements, such as a sensing technology, wired/wireless communication and network infra, service interface technology, and a security technology, are required. There is a recent ongoing research for inter-object connection technologies, such as the sensor network, Machine-to-Machine (M2M), or the Machine-Type Communication (MTC).

In the IoT environment may be offered intelligent Internet Technology (IT) services that collect and analyze the data generated by the things connected with one another to create human life a new value. The IoT may have various applications, such as the smart home, smart building, smart city, smart car or connected car, smart grid, health-care, or smart appliance industry, or state-of-art medical services, through conversion or integration of existing IT technologies and various industries.

Thus, there are various ongoing efforts to apply the 5G communication system to the IoT network. For example, the sensor network, machine-to-machine (M2M), machine type communication (MTC), or other 5G techniques are implemented by schemes, such as beamforming, multi-input multi-output (MIMO), and array antenna schemes. The above-mentioned application of the cloud radio access network as a Big data processing technique may be said to be an example of the convergence of the 5G and IoT technologies.

Machine-type communication (MTC) is technology assigning sensors/communication functions to all things to intelligently gather and mutually transfer information. MTC may interchangeably be termed Machine-to-machine (M2M) or Internet of Things (IoT).

As communication techniques to implement MTC, short-range communication schemes and remote communication schemes may come into use. Short-range communication schemes for MTC include small coverage communication schemes, such as Bluetooth (or Bluetooth Low Energy (BLE)), near-field communication (NFC), or Wireless-Fidelity (Wi-Fi). As techniques for implementing MTC with broad coverage (hereinafter, referred to as "cellular MTC"), standard cellular communication schemes, such as 3rd Generation Partnership Project (3GPP) Long Term Evolution (LTE), may be used. For reference, standard techniques for MTC are under discussion in 3GPP LTE systems. Further, some operators are deploying MTC-related businesses using current cellular networks. Various non-standardized techniques for cellular MTC also exist. For reference, information exchanged between devices in cellular MTC features a low data rate, low duty cycle, and relative less delay sensitivity.

SUMMARY

The present disclosure provides a method and apparatus for determining frequency resources and transmits power for MTC communication where a MTC communication system and a cellular communication system co-exist.

The present disclosure provides a method and apparatus for determining frequency resources and transmits power for MTC communication when one MTC base station and one cellular base station co-exist, and a MTC terminal does not perform power control.

The present disclosure provides a method and apparatus for determining frequency resources and transmits power for MTC communication when one MTC base station and one cellular base station co-exist, and a MTC terminal performs power control.

The present disclosure provides a method and apparatus for determining frequency resources and transmits power for MTC communication when one MTC base station and multiple cellular base stations co-exist, and a MTC terminal does not perform power control.

The present disclosure provides a method and apparatus for determining frequency resources and transmits power for MTC communication when one MTC base station and multiple cellular base stations co-exist, and a MTC terminal performs power control.

The present disclosure provides a method and apparatus for obtaining distance information between a MTC terminal and base stations.

The present disclosure provides a method and apparatus for determining candidate frequency resources and/or transmit power based on distance information between a MTC terminal and base stations.

The present disclosure provides a method and apparatus for determining frequency resources and transmits power where a MTC communication system and a cellular communication system co-exist, and a terminal accesses the MTC communication system through random access.

The present disclosure provides a method and apparatus for allocating a frequency resource and transmits power for MTC communication to a terminal by base station scheduling where a MTC communication system and a cellular communication system co-exist.

As provided by the present disclosure, a method for determining an uplink transmission resource of a wireless communication system comprises the steps of obtaining at least one of a first distance value between a first base station supporting a first communication system and a terminal supporting the first communication system and a second distance value between a second base station supporting a second communication system and the terminal and determining a frequency resource for uplink signal transmission of the terminal based on the obtained at least one distance value of the first distance value and the second distance value.

As provided by the present disclosure, an apparatus for determining an uplink transmission resource of a wireless communication system comprises a transceiver obtaining at least one of a first distance value between a first base station supporting a first communication system and a terminal supporting the first communication system and a second distance value between a second base station supporting a second communication system and the terminal and controller determining a frequency resource for uplink signal transmission of the terminal based on the obtained at least one distance value of the first distance value and the second distance value.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

DETAILED DESCRIPTION

Figure 1:
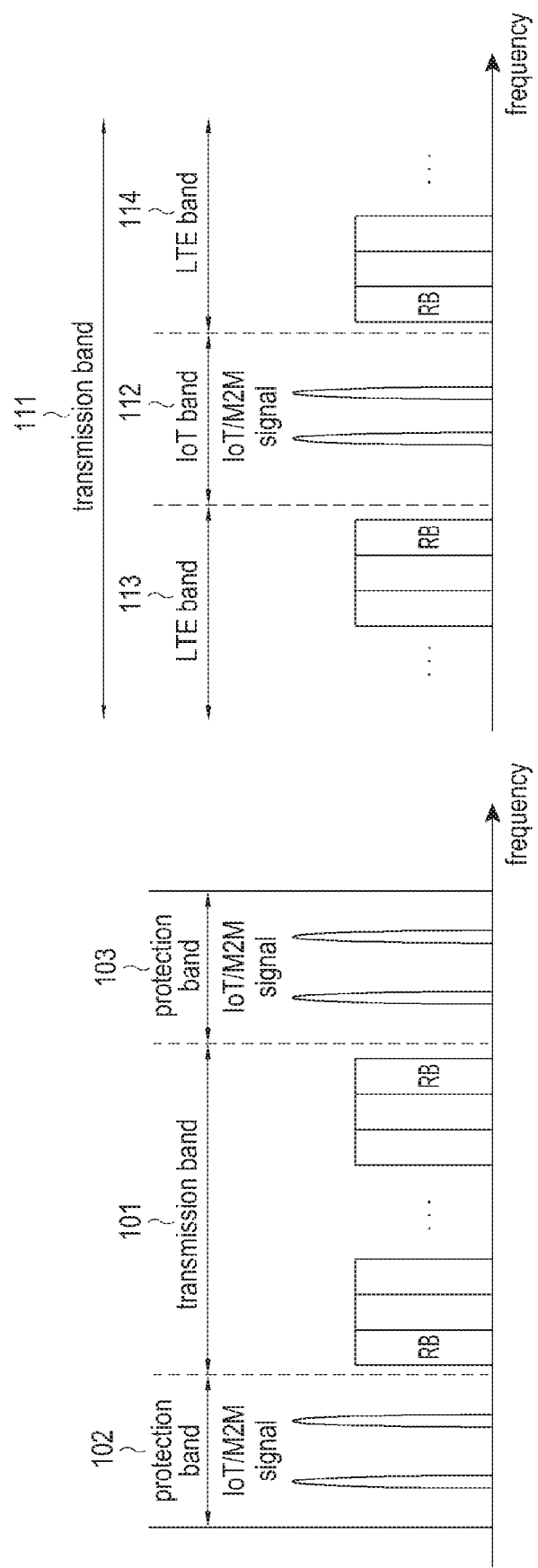
FIG. 1 is a view illustrating a main band and an nearby band for a MTC system according to an embodiment of the present disclosure.

Hereinafter, various embodiments of the present disclosure are described in detail with reference to the accompanying drawings. The same reference denotations may be used to refer to the same or similar elements throughout the specification and the drawings. When making the gist of the present disclosure unclear, the detailed description of known functions or configurations is skipped. It should be noted that the following description primarily focuses on what is necessary for understanding the operations of the embodiments, omitting descriptions unnecessary for clarifying the subject matter of the present disclosure.

Apparatuses and methods as proposed herein may be applicable to various communication systems including, but not limited to, long-term evolution (LTE) wireless communication systems, long-term evolution-advanced (LTE-A) wireless communication systems, high speed downlink packet access (HSDPA) wireless communication systems, high speed uplink packet access (HSUPA) wireless communication systems, 3rd generation project partnership 2 (3GPP2) high rate packet data (HRPD) wireless communication systems, wideband code division multiple access (WCDMA) wireless communication systems, code division multiple access (CDMA) wireless communication systems, Institute of electrical and electronics engineers (IEEE) 802.16m communication systems, evolved packet systems (EPSs), and mobile Internet protocol (Mobile IP) systems.

The present disclosure proposes a method and apparatus for determining a MTC transmit reference resource and/or transmit power for transmitting an uplink signal of a MTC terminal when a MTC communication system performs uplink communication through a band adjacent to a band used in another cellular wireless communication system.

Used for such purposes are path loss information between a base station communicating using a "main band" a terminal communicating using an "nearby band" adjacent to the main band and path loss information between a communication base station using the nearby band and a terminal communicating using the nearby band. For reference, the main band means a band assigned for signal transmission and reception by a corresponding communication system, and the nearby band means a band adjacent to the main band. The definition of the main band and the nearby band is described in greater detail with reference to FIG. 1.

A scheme proposed in this disclosure may maximize the transmit bandwidth and coverage of communication in the nearby band within the limit following limitations on the communication system using the main band, thus maximizing the usability of the nearby band part where there is no signal transmission of the communication system using the main band.

Prior to describing in detail the present disclosure, the basic concept of embodiments of the present disclosure are briefly described.

The basic concept of embodiments of the present disclosure is to determine a frequency resource and/or transmit power for uplink signal transmission of a first terminal based on path loss information between the first terminal and a first base station supporting a first communication system and path loss information between the first terminal and a second base station supporting a second communication system. Here, the first base station and the first terminal use a first band, and the second base station uses a second band.

According to an embodiment of the above-described basic concept, given the case where a MTC system and a LTE system co-exist, and the MTC system uses a protection band of the LTE system, the first base station may become the MTC base station, the second base station may become the LTE base station, and the terminal may become the MTC terminal. However, the "MTC terminal" is not limited to a terminal supportive only of MTC functions but includes, e.g., a terminal capable of both LTE and MTC communication functions.

That is, according to an embodiment of the present disclosure, where a MTC system and a LTE system co-exist, and the MTC system uses a protection band of the LTE system, the MTC terminal (i.e., the first terminal) determines a transmit frequency resource and/or transmit power for uplink signal transmission in the protection band according to a path loss between the MTC base station (i.e., the first base station) and the MTC terminal and a path loss between the LTE base station (i.e., the second base station) and the MTC terminal (i.e., the first terminal).

Hereinafter, the description focuses primarily on cases where the MTC system and the LTE system co-exist, and the MTC system uses the protection band of the LTE system. However, this is merely an example, and the present disclosure is not limited to the cases where the MTC system and the LTE system co-exist. Further, since the MTC system uses the "protection band" of the LTE system, a band where signal transmission and reception is performed in the LTE system is denoted a "main band" as contrasted by the protection band, for ease of description.

Further, as default, there is assumed to be a downlink between the MTC base station and the MTC terminal. However, embodiments of the present disclosure may also be applicable to systems free of downlink if the terminal is without mobility.

Meanwhile, expanding the concept of "protection band" may make such a setting as to enable the MTC system to use a portion of a "use band" of the LTE system as well as the "protection band" of the LTE system. Thus, according to the present disclosure, as a concept expanded from the "protection band," a band used by the MTC system may also be defined as an "nearby band" adjacent to the "main band" where signal transmission and reception is performed in the LTE system.

This is one expanded from an embodiment of the present disclosure. The MTC system proposed according to the present disclosure performs communication using a "nearby band" adjacent to a band actually used by the LTE system. That is, the "nearby band" means a band adjacent to the "main band" assigned for actual signal transmission and reception in a communication system (i.e., the LTE system in the above example) other than the MTC system.

In sum, the term "nearby band" according to the present disclosure may come up with two definitions. First, "protection bands" adjacent to both sides of a "transmission band" assigned for a legacy cellular communication system (e.g., a LTE system) may be "nearby bands." Second, a portion of a transmission band assigned for the LTE system may be a "nearby band."

FIG. 1 is a view illustrating a main band and an adjacent band for a MTC system according to an embodiment of the present disclosure.

(a) illustrates the first case above, wherein "protection bands" 102 and 103 positioned adjacent to both sides a "transmission band" 101 which is assigned for legacy cellular communication are "nearby bands." In this case, the transmission band 101 becomes a "main band," and the protection bands 102 and 103 become nearby bands. MTC data is transmitted and received in the nearby bands 102 and 103.

(b) illustrates the second case above, wherein a partial band 112 of a "transmission band" 101 which is assigned for legacy cellular communication is defined as a "nearby band." In this case, bands 113 and 114 of the transmission band, where cellular data transmission and reception is indeed performed become "main bands," and the band 112 between the main bands 113 and 114 becomes a nearby band. MTC data is transmitted and received in the nearby band 112.

However, for ease of description, the description mainly focuses on the case where the MTC system performs data transmission and reception using the protection band of the LTE system as per (a). In other words, the description is made under the assumption that the main band is the transmission band of the LTE system, and the nearby band is the protection band of the LTE system. Hence, the term "protection band" may interchangeably be used with the term "nearby band." Further, the term "main band" may interchangeably be used with the term "LTE transmission band."

Meanwhile, the following description is mainly directed to the circumstance where in the MTC system the MTC base station does not perform base station scheduling, and a plurality of MTC terminals accesses the MTC base station through random access (RA). Embodiments under the assumption of random access are described below with reference to FIGS. 2 to 8. However, the present disclosure does not exclude scheduling by the MTC base station, and thus, embodiments in which base station scheduling is carried out are also described. An embodiment in which base station scheduling is performed is described with reference to FIG. 9.

Meanwhile, as proposed according to the present disclosure, the use, in the MTC system, of the nearby band not used for direct communication, among frequencies assigned for cellular communication may raise frequency usability, increasing system performance in light of the overall system bandwidth. However, interference with the main band used in the LTE system upon MTC communication using the nearby band and signal radiations from the main band to an outer band should fall within a permitted value.

The MTC system proposed herein may transmit and receive signals using ultra narrow band (UNB) signals upon MTC communication. Uplink transmission using a UNB signal presents the following advantages. Since the UNB signal has the nature of high power spectral density (PSD), a large signal gain relative to noise and/or interference may be obtained, and as the section influenced by the side lobe caused by instable hardware decreases, interference with the nearby band reduces. Such UNB signal enables simultaneous access by multiple terminals in a given bandwidth when transmitting a MTC uplink signal through the nearby band. Further, the UNB signal is adequate in light that it is robust against interference coming over to the nearby band from the main band and ensures broad coverage. However, the MTC system according to the present disclosure is not limited to involving only ultra-narrow band signal transmission.

Figure 2:
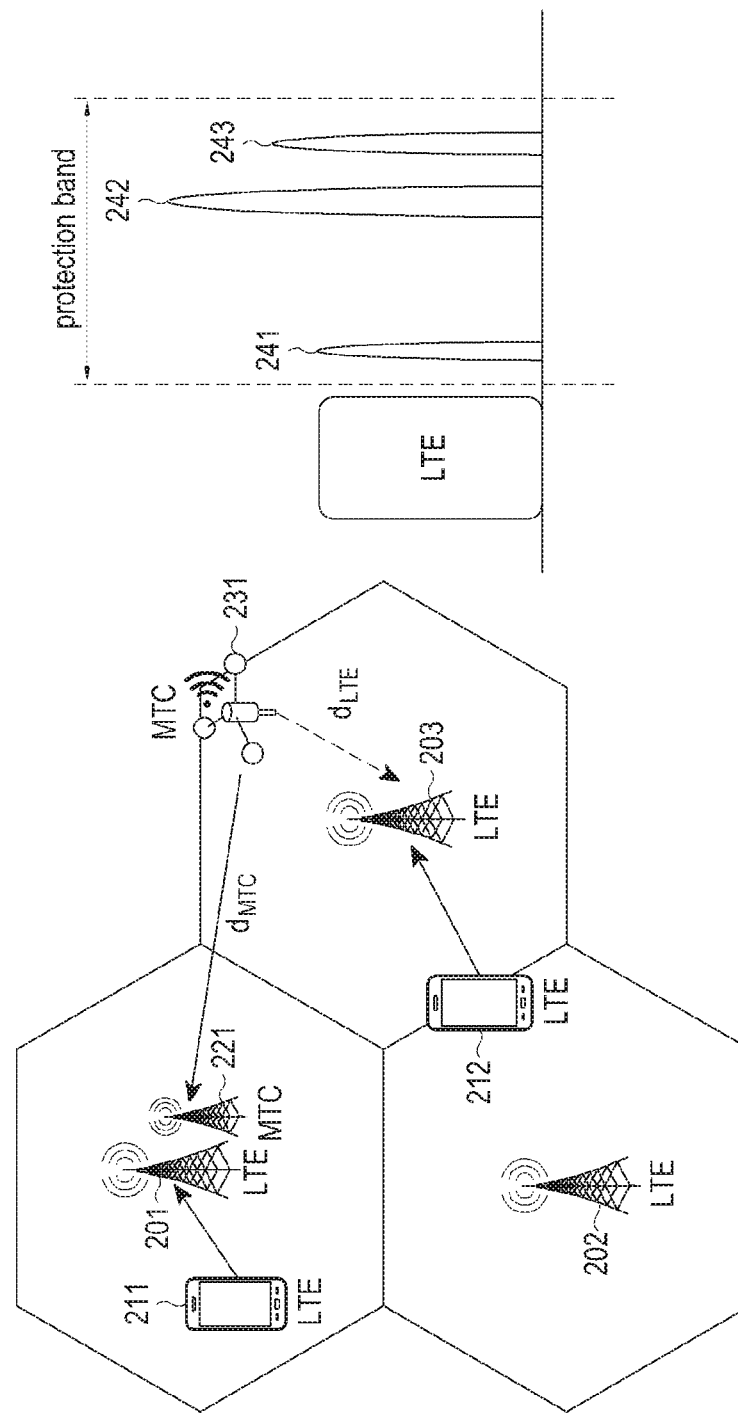
FIG. 2 is a view illustrating uplink transmit signals of a MTC terminal and a MTC system that co-exists with a LTE system according to an embodiment of the present disclosure.

FIG. 2 is a view illustrating uplink transmit signals of a MTC terminal and a MTC system that co-exists with a LTE system according to an embodiment of the present disclosure.

(a) illustrates a MTC system that co-exists with a LTE system, wherein there is assumed to be three LTE base stations 201, 202, and 203, one MTC base station 221, two LTE terminals 211 and 212, and one MTC terminal 231. For reference, the MTC base station need not be the same in coverage as the LTE base station. As the coverage of the MTC base station increases, the MTC base station has more advantages in light of installation and operation. Further, $d_{LTE}$ denotes the distance between the MTC terminal 231 and the LTE base station 211 closest to the MTC terminal 231, and $d_{MTC}$ denotes the distance between the MTC base station 221 and the MTC terminal 231.

In the above-described MTC system, the MTC terminal 231 may determine a frequency resource and transmit power where a UNB signal is to be transmitted within the protection band based on at least one of $d_{LTE}$ and $d_{MTC}$.

(b) illustrates an example UL signal transmitted from the MTC terminals through the protection band. Each MTC terminal may determine a frequency and transmit power where a UL signal is to be transmitted in the protection band and may transmit the UL signal. (b) illustrates three UL signals 241, 242, and 243, each of which is one transmitted from one MTC terminal.

Meanwhile, the MTC terminal 231 should consider interference between the MTC system and the LTE system upon determining the frequency resource and transmit power for uplink transmission in the protection band. Specifically, there should be taken into account "in-band interference" which is interference with the LTE terminal by the MTC communication and interference with the MTC terminal by the LTE communication.

Figure 3:
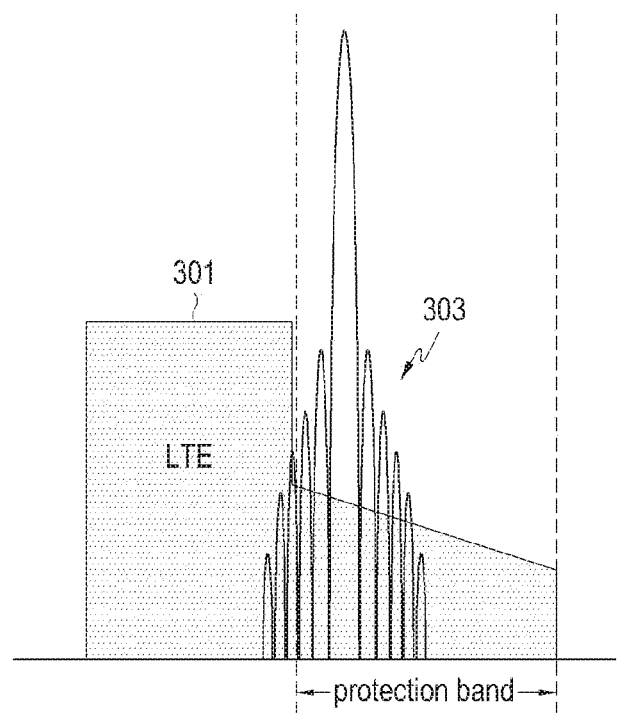
FIG. 3 is a view illustrating in-band interference with a LTE terminal as described in connection with FIG. 2 by MTC communication and interference with the MTC terminal by LTE communication.

FIG. 3 is a view illustrating in-band interference with a LTE terminal as described in connection with FIG. 2 by MTC communication and interference with the MTC terminal by LTE communication.

Reference number 301 indicates that LTE signals transmitted and received in the main band for LTE communication may be radiated in the protection band and may cause interference with the MTC entity. Further, reference number 303 indicates that MTC signals transmitted and received in the protection band may be radiated in the main band and may interfere with the LTE entity. For reference, reference numbers 301 and 303 may cause out-of-band interference with an area other than the communication bands (transmission band and protection band) where data communication is performed. Further, the signal radiated out of each transmission band typically comes from hardware instability.

Meanwhile, where the LTE system and the MTC system co-exist, it is critical that the LTE communication is not subject to interference by the MTC communication. However, the in-band interference that the LTE terminal may experience may seriously arise where the MTC terminal uses a frequency resource very close to the main band or where the transmit power of the MTC terminal positioned adjacent to the LTE base station is large.

The present disclosure targets the following within the scope observing the system limitations when the MTC terminal determines the transmit resource and transmit power in the protection band, considering such interference issue:

Having maximum MTC coverage;

Securing maximum MTC transmit bandwidth in the protection band, which is for enabling simultaneous access by as many MTC terminals as possible; and Observing the in-band/out-of-band standard.

In the third prong, the standard is to observe a preset interference limit, and the system has an in-band standard and out-of-band standard designated therein.

Now described are various scenarios where a LTE base station and a MTC base station exist according to embodiments of the present disclosure.

A first embodiment is directed to the case where a MTC terminal does not perform power control under the situation where one LTE base station and one MTC base station co-exist.

A second embodiment is directed to the case where a MTC terminal performs power control under the situation where one LTE base station and one MTC base station co-exist.

A third embodiment is directed to the case where a MTC terminal performs power control under the situation where multiple LTE base stations and one MTC base station co-exist.

The first and second embodiment assumes circumstances that may arise in rural areas with sparse LTE base stations and is described with reference to FIG. 4. The third embodiment assumes circumstances that may arise in urban areas with dense LTE base stations and is described with reference to FIG. 5.

Figure 4:
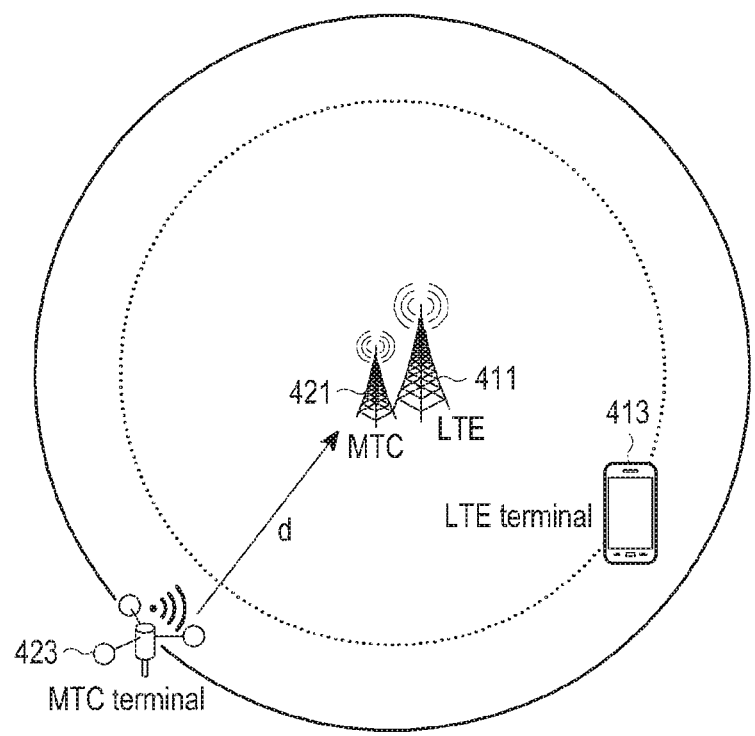
FIG. 4 is a view illustrating operations of a MTC terminal where one LTE base station and one MTC base station co-exist according to a first and second embodiment of the present disclosure.

FIG. 4 is a view illustrating operations of a MTC terminal where one LTE base station and one MTC base station co-exist according to a first and second embodiment of the present disclosure.

FIG. 4 illustrates, for ease of description, one LTE terminal 413 and one MTC terminal 423 under the assumption that there are one LTE base station 411 and one MTC base station 421.

According to the first embodiment of the present disclosure, if one LTE base station and one MTC base station co-exist, and the MTC terminal does not perform power control, then the MTC terminal 423 operates as follows.

In a first step, the MTC terminal 423 measures the RSSI using a reference signal received from the MTC base station 421, calculates a path loss between the MTC base station 421 and the MTC terminal 423 using the RSSI, and estimates the distance ($d_{MTC}$) between the MTC base station 421 and the MTC terminal 423 based on the path loss. Meanwhile, where one LTE base station 411 and the MTC base station 421 co-exist at the same location, the distance ($d_{MTC}$) between the MTC base station 421 and the MTC terminal 423 is the same as the distance ($d_{LTE}$) between the LTE base station 411 and the MTC terminal 423.

In a second step, the MTC terminal 423 determines at least one candidate frequency for signal transmission using $d_{MTC}$.

At this time, in order to reduce interference with LTE uplink communication by the MTC uplink transmission as the distance ($d_{MTC}$) between the MTC base station 421 and the MTC terminal 423, at least one of frequency resources positioned further away from the main band may be determined as the candidate frequency. Further, if the distance ($d_{MTC}$) between the MTC base station 421 and the MTC terminal 423 is large as in the case where the MTC terminal 423 is located at the edge of the cell of the MTC base station 421, a frequency resource in the area away from the main band is determined as the candidate frequency so as to reduce interference with the MTC communication by the LTE communication. Meanwhile, where the MTC terminal is so distant as to be away from the MTC base station at an intermediate distance or so, a frequency in the protection band positioned close to the main band is selected. However, the degree of the MTC terminal being proximate or away may be determined according to predetermined references. The first embodiment is described again with reference to FIG. 6.

In a third step, a final transmission channel for MTC uplink transmission is selected from the candidate frequencies. At this time, the final transmission channel may be chosen randomly.

According to the second embodiment of the present disclosure, if one LTE base station and one MTC base station co-exist, and the MTC terminal performs power control, then the MTC terminal 423 operates as follows.

In a first step, the MTC terminal 423 measures the RSSI using a reference signal received from the MTC base station 421, calculates a path loss between the MTC base station 421 and the MTC terminal 423 using the RSSI, and estimates the distance ($d_{MTC}=d_{LTE}$) between the MTC base station 421 and the MTC terminal 423 based on the path loss.

In a second step, the MTC terminal 423 selects at least one candidate frequency and transmits power for uplink signal transmission using the estimated distance information. At this time, the candidate frequency and transmit power may be selected using Equation 1 below.

Select $\forall n$ and corresponding $P_{TX,MTC}(n)$ which satisfies $P_{TX,MTC}(n) \leq P_{max,MTC}$ and $SINR_{MTC}(n) > SINR_{req,MTC}$ where $SINR_{MTC}(n)=f(P_{TX,MTC}(n), PL_{MTC}(d), INT_{LTE\text{-}to\text{-}MTC}(n), N_0)$ such that $INT_{MTC\text{-}to\text{-}LTE}(n) < E_{IB}$ and $INT_{MTC\text{-}to\text{-}OOB} < E_{OOB}$     [Equation 1]

The symbols in Equation 1 denote the following:

n is the nth possible channel on the frequency axis in the protection band, $P_{TX,MTC}(n)$ is the transmit power that the MTC terminal uses upon transmission in the nth frequency resource, $P_{max,MTC}$ is the maximum possible transmit power of the MTC terminal, $SINR_{MTC}(n)$ is the SINR where the MTC terminal uses the nth frequency resource, $SINR_{req,MTC}$ is the minimum SINR as required for MTC uplink communication, $PL_{MTC}(d)$ is the path loss between the MTC base station and the MTC terminal, $INT_{MTC\text{-}to\text{-}LTE}(n)$ is interference with the MTC terminal by the LTE communication, $N_0$ is noise power, $INT_{MTC\text{-}to\text{-}LTE}(n)$ is interference with the nearby LTE transmission band by the uplink communication of the MTC terminal, $E_{IB}$ is the amount of interference permitted for in-band radiation, $INT_{MTC\text{-}to\text{-}OOB}$ is the amount of out-of-band radiation by the MTC terminal, $E_{ooB}$ is the amount of interference permitted for out-of-band radiation, Meanwhile, $INT_{LTE\text{-}to\text{-}MTC}(n)$ may be inferred based on a value obtained by previously measuring the LTE communication frequency pattern in the protection band. For reference, since in the first and second embodiment the MTC base station and the LTE base station are located at the same position, $d_{MTC}=d_{LTE}$. Accordingly, in Equation 1 above and FIG. 4, $d_{MTC}=d_{LTE}$ is denoted d for the purpose of simple denotation.

In the above-described second embodiment of the present disclosure, the in-band standard and the out-of-band standard may be satisfied by Equation 1 above, and at least one candidate frequency resource and transmit power may be determined which meet the minimum SINR required for MTC communication.

In a third step, the MTC terminal 423 determines a final transmission frequency resource and transmit power from the candidate frequency resource and transmit power determined by Equation 1. At this time, it may be determined randomly from the candidate frequency channels, or the candidate frequency resource and transmit power minimizing the transmit power may be determined to be the final frequency resource and transmit power.

Figure 5:
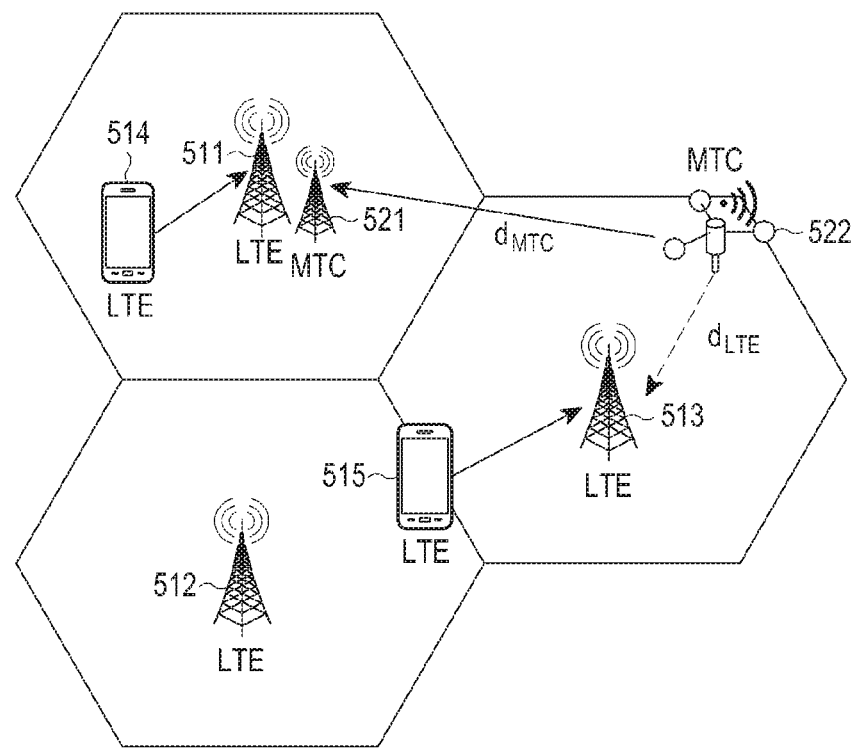
FIG. 5 is a view illustrating operations of a MTC terminal when the MTC terminal performs power control where a plurality of LTE base stations and one MTC base station co-exist according to a third embodiment of the present disclosure.

FIG. 5 is a view illustrating operations of a MTC terminal when the MTC terminal performs power control where a plurality of LTE base stations and one MTC base station co-exist according to a third embodiment of the present disclosure.

The third embodiment, unlike in the first and second embodiment, is directed to the case where there is one MTC terminal and multiple LTE base stations. The third embodiment would be a more normal case than the first and second embodiment. FIG. 5 illustrates one MTC terminal 522 and two LTE terminals 514 and 515 under the assumption that there are one MTC base station 521 and three LTE base stations 511, 512, and 513.

What should be considered regarding the operation of the MTC terminal 522 under this circumstance is which LTE base station of cell coverage the MTC terminal 522 is located. This is why the strength of interference with each LTE base station differs depending on the location of the MTC terminal 522. Thus, according to the third embodiment of the present disclosure, candidate frequencies and transmit power of the MTC terminal 522 are determined based on at least one of the distance ($d_{LTE}$) between the MTC terminal and the LTE base station closest to the MTC terminal and the distance ($d_{MTC}$) between the MTC base station 521 and the MTC terminal 522.

According to the third embodiment of the present disclosure, the MTC base station 521 operates as follows.

In a first step, the MTC terminal 522 measures a path loss using the RS SI of a receive signal measured between the MTC base station 521 and the MTC terminal 522 and estimates the distance ($d_{MTC}$) between the MTC base station 521 and the MTC terminal 522 based on the path loss. Further, the MTC terminal 522 measures the RS SI of receive signals from the plurality of LTE base stations 511, 512, and 513 calculate their respective path losses, and estimates the distance ($d_{LTE}$) between the MTC terminal 522 and the LTE base station 513 closest to the MTC terminal 522 therefrom.

In a second step, the MTC terminal 522 selects at least one candidate frequency and transmits power for signal transmission based on at least one of $d_{MTC}$ and $d_{LTE}$. At this time, the candidate frequency and transmit power may be selected using Equation 2 below.

Select $\forall n$ and corresponding $P_{TX,MTC}(n)$ which satisfies $P_{TX,MTC}(n) \leq P_{max,MTC}$ and $SINR_{MTC}(n) > SINR_{req,MTC}$ where $SINR_{MTC}(n) = f(P_{TX,MTC}(n), PL_{MTC}(d_{MTC}), INT_{LTE\text{-}to\text{-}MTC}(n), N_0)$ such that $INT_{MTC\text{-}to\text{-}NearestLTE}(n) < E_{IB}$ and $INT_{MTC\text{-}to\text{-}OOB} < E_{OOB}$ [Equation 2]

The symbols in Equation 2 are the same as those in Equation 1, except for the following differences.

A difference in scheme between the third embodiment and the second embodiment in selecting the candidate frequency and transmit power is that references for interference with the LTE communication by the MTC communication differ in the second embodiment and the third embodiment. For example, the LTE cell receiving the highest interference by the uplink communication of the MTC terminal 522 is the cell of the LTE base station 513 located closest to the MTC terminal 522. Thus, in Equation 2, $INT_{MTC\text{-}to\text{-}Nearest,\ LTE}(n)$ is measured based on the distance ($d_{LTE}$) between the LTE base station 513 and the MTC terminal 522, and accordingly, at least one candidate frequency resource and transmit power are selected.

In a third step, the MTC terminal 522 determines a final transmission frequency resource and transmit power from the candidate frequency resource and transmit power determined by Equation 2. At this time, the final frequency channel and transmit power may be determined randomly from the candidate frequency channels, or the frequency resource and transmit power minimizing the transmit power may be determined to be the final frequency channel and transmit power.

The third embodiment is directed to the case where the MTC terminal performs power control under the situation where multiple LTE base stations and one MTC base station are present. However, even in the third embodiment, like in the first embodiment, no power control may be performed. In such case, the MTC terminal, because of abstaining from performing power control, would select at least one candidate frequency alone for signal transmission based on the distance information (at least one of $d_{MTC}$ and $d_{LTE}$).

Figure 6:
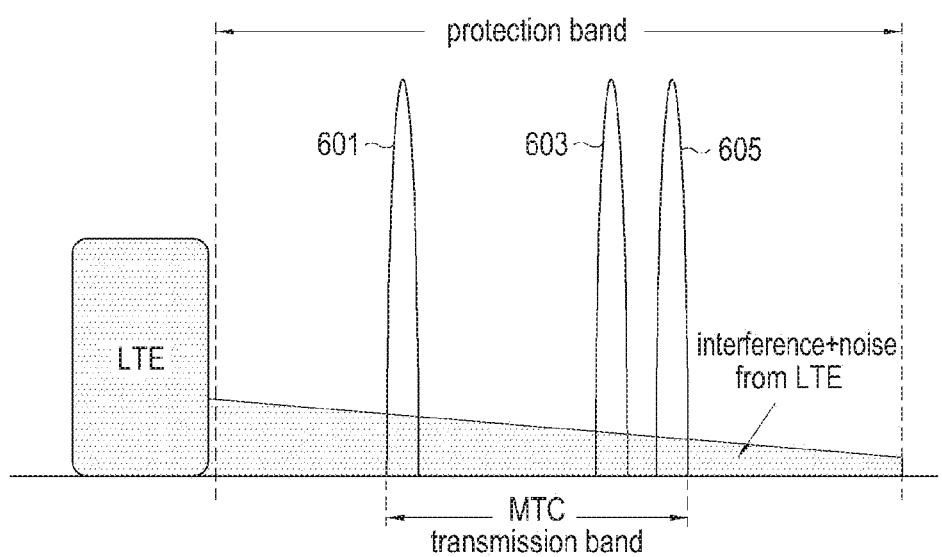
FIG. 6 is a view illustrating a scheme in which a MTC terminal selects a transmit frequency when the MTC terminal does not perform power control where one LTE base station and one MTC base station co-exist according to the first embodiment of the present disclosure.

FIG. 6 is a view illustrating a scheme in which a MTC terminal selects a transmit frequency when the MTC terminal does not perform power control where one LTE base station and one MTC base station co-exist according to the first embodiment of the present disclosure.

As set forth above, where the MTC terminal approaches the MTC base station or is away from the MTC base station, as when it is located at the cell edge, it chooses a frequency resource in the protection band positioned away from the main band. By contrast, where the MTC terminal is so distant as to be away from the MTC base station at an intermediate distance or so, a frequency in the protection band positioned close to the main band is selected. In FIG. 6, reference number 601 denotes an example of the frequency resource selected by the MTC terminal located away from the MTC base station at an intermediate distance or so, as described above, and reference number 603 or 605 denotes an example of the frequency resource selected by the MTC terminal away from or near the MTC base station. The area from 601 to 605 denotes the transmission band that falls within the scope where the MTC communication observes the in-band limitation and out-of-band limitation for interference, according to the first embodiment. For reference, since no power control is carried out in the first embodiment, the magnitude of transmit power of each uplink transmission signal 601, 603, and 605 may be seen as being the same.

Figure 7:
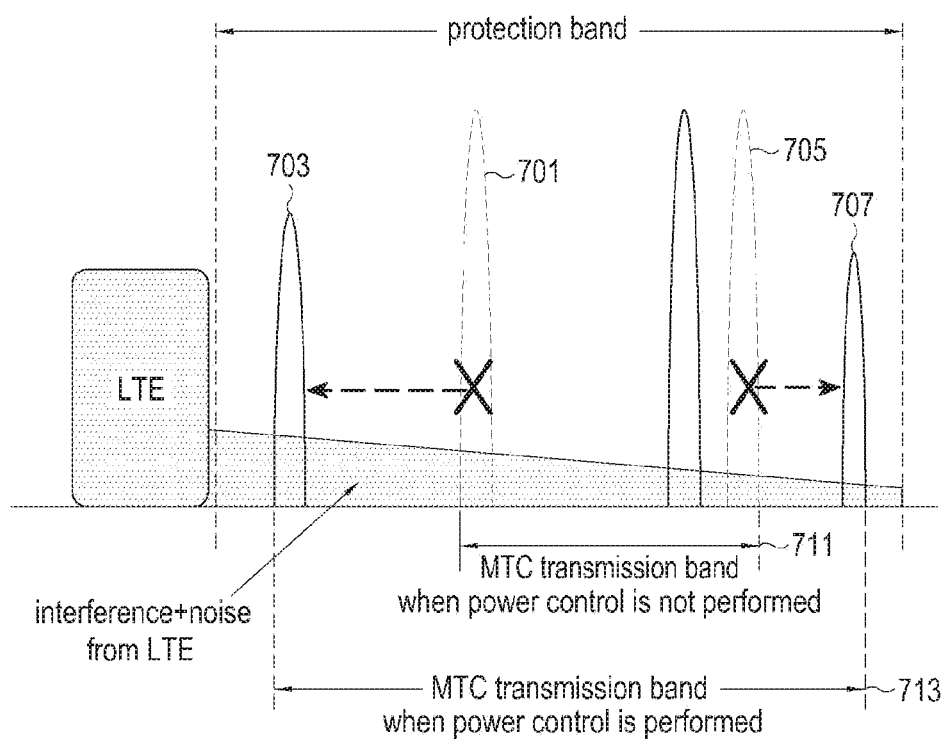
FIG. 7 is a view illustrating an example in which a MTC terminal selects a frequency resource and transmit power when performing power control where one LTE base station and one MTC base station co-exist according to the second embodiment of the present disclosure.

FIG. 7 is a view illustrating an example in which a MTC terminal selects a frequency resource and transmit power when performing power control where one LTE base station and one MTC base station co-exist according to the second embodiment of the present disclosure.

Also in the second embodiment, similar to the first embodiment, the MTC terminal positioned close or away from the MTC base station selects a frequency resource positioned away from the main band in the protection band, and where the MTC terminal becomes apart from the MTC base station at the order of an intermediate distance, the MTC terminal selects a frequency resource in the protection band positioned close to the main band. In the second embodiment, however, the MTC terminal may perform power control and thus may choose a frequency resource placed at a position other than it would have unless performing power control.

A first example is denoted with reference number 701 and 703.

It is assumed that the MTC terminal is located at an intermediate distance from the MTC base station, and the MTC terminal chooses the frequency resource 701 positioned close to the main band. However, in the second embodiment, the MTC terminal is able to perform power control. Thus, where the MTC terminal chooses a frequency resource 703 positioned closer to the main band, although uplink transmission is performed using the frequency resource 703, the interference with the LTE communication by the uplink signal of the MTC terminal may be minimized by reducing the transmit power. In other words, as per the first example, the MTC terminal could have selected reference number 701 as the frequency resource positioned closest to the main band unless it had performed power control. However, since the MTC terminal can perform power control, it may transmit an uplink signal using reference number 703 which is a frequency resource positioned closer to the main band by reducing transmit power. By doing so, the MTC transmission band 713 when power control is performed can be seen as being increased as compared with the MTC transmission band 711 when no power control is performed. Thus, the frequency band available for MTC communication in the protection band may be increased, encompassing more MTC terminals.

A second example is denoted with reference number 705 and 707.

It is assumed that the MTC terminal is located close to the MTC base station or at the cell edge, and the MTC terminal chooses the frequency resource 705 positioned away from the main band without performing power control. However, in the second embodiment, the MTC terminal is able to perform power control. Thus, where the MTC terminal chooses a frequency resource 707 positioned farther from the main band, although uplink transmission is performed using the frequency resource 707, the interference with the righthand outer band of the protection band by the uplink signal of the MTC terminal may be minimized by reducing the transmit power. In other words, as per the second example, the MTC terminal could have selected reference number 705 as the frequency resource positioned farthest from the main band unless it had performed power control. However, since the MTC terminal can perform power control, it may transmit an uplink signal using reference number 707 which is a frequency resource positioned further from the main band by reducing transmit power. By doing so, the MTC transmission band 713 when power control is performed can be seen as being increased as compared with the MTC transmission band 711 when no power control is performed. Thus, the frequency band available for MTC communication in the protection band may be increased, encompassing more MTC terminals.

Now described is a scheme for the MTE terminal obtaining distance information ($d_{MTC}$, $d_{LTE}$) between the MTC terminal and the LTE/MTC base station.

A first scheme is the one measuring the RSSI of a reference signal sent through a resource in the protection band for MTC communication. In this scheme, the MTC base station and the LTE base station send reference signals (RS s) through predetermined frequency resources in the protection band, and the MTC terminal measures the RS SI of the reference signals, calculates path losses, and obtains distance information from the calculated path losses.

A second scheme is the one measuring the RSSI of a reference signal sent through a resource in the main band for LTE communication. In this scheme, the MTC base station and the LTE base station send reference signals (RS s) through predetermined frequency resources in the protection band, and the MTC terminal measures the RS SI of the reference signals, calculates path losses, and obtains distance information from the calculated path losses.

A third scheme is the one using location information obtained from GPS information, rather than measuring the RSSI of reference signals. The MTC terminal may obtain its own GPS information and GPS information of its nearby MTC/LTE base station, compare both, and obtain distance information between the MTC terminal and the LTE/MTC base station.

An example in which a candidate frequency resource and transmit power are configured as per the above-described embodiments is described below.

The candidate frequency resource and transmit power mapped to the distance information ($d_{LTE}$, $d_{MTC}$) are previously stored in the form of a table, and at least one candidate frequency resource and transmit power may be determined from the previously stored table. Further, the candidate frequency and transmit power may be configured so that they depend upon each other, e.g., in a (candidate frequency, transmit power) pair. An example of mapping the distance information with the candidate frequency resource and transmit power is described. If the distance information value is a, the (candidate frequency resource, transmit power) corresponding to a may previously be set to (x, y) or (l, m). That is, a plurality of (candidate frequency resource, transmit power) pairs may correspond to one distance information.

Figure 8:
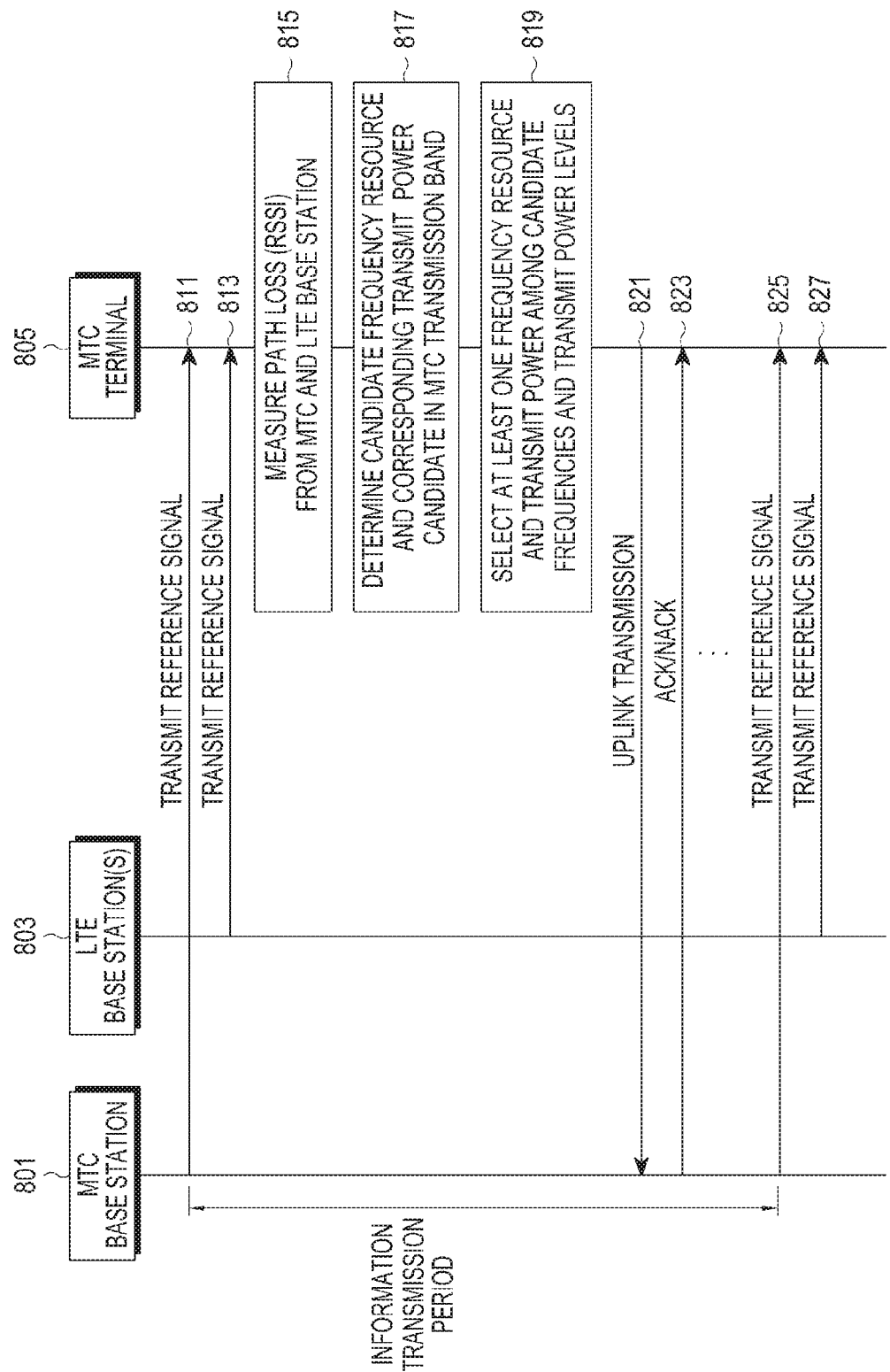
FIG. 8 is a view illustrating signal transmission and reception between a MTC terminal and a MTC base station/LTE base station where distance information is obtained based on a RSSI measurement of a reference signal according to an embodiment of the present disclosure.

FIG. 8 is a view illustrating signal transmission and reception between a MTC terminal and a MTC base station/LTE base station where distance information is obtained based on a RSSI measurement of a reference signal according to an embodiment of the present disclosure.

In steps 811 and 813, the MTC base station 8001 and the LTE base station 803 each send a reference signal to the MTC terminal 805. Here, the frequency resource where the reference is sent may be a predetermined frequency resource in the protection band or main band as set forth above.

In step 815, the MTC terminal 805 receives the reference signal, measures the RSSI fro the MTC base station 801 and/or LTE base station 803, calculates a path loss therefrom, and estimates the distance ($d_{MTC}$) between the MTC base station 801 and the MTC terminal 805 and/or the distance ($d_{LTE}$) between the MTC terminal 805 and the LTE base station closest to the MTC terminal 805 from the calculated path loss. However, as described above, the distance information may also be obtained by GPS information.

In step 817, the MTC terminal 805 determines at least one candidate frequency resource and/or transmits power by the schemes described in connection with the above embodiments. That is, if the MTC terminal performs power control, the MTC terminal determines the candidate frequency resource and transmit power using Equation 1 or Equation 2, and if not, determines the candidate frequency resource alone.

In step 819, the MTC terminal 805 determines a final transmit frequency resource and/or transmit power from the determined candidate frequency resource and/or transmit power.

In step 821, the MTC terminal 805 performs uplink transmission by applying the determined final frequency resource and/or transmits power. In step 823, the MTC base station 801 sends an ACK/NACK signal responsive to the uplink transmission to the MTC terminal 805.

Thereafter, in steps 825 and 827, the MTC base station 801 and the LTE base station 803 each send a reference signal to the MTC terminal 805 as per a next period of sending a reference signal. Steps 815 to 823 described above are then repeated.

FIG. 8 described above assumes that no base station scheduling is applied in the MTC system, and the MTC terminals access through random access. In an alternative embodiment, base station scheduling may apply in the MTC system. Operations where base station scheduling applies in the MTC system are described below.

Figure 9:
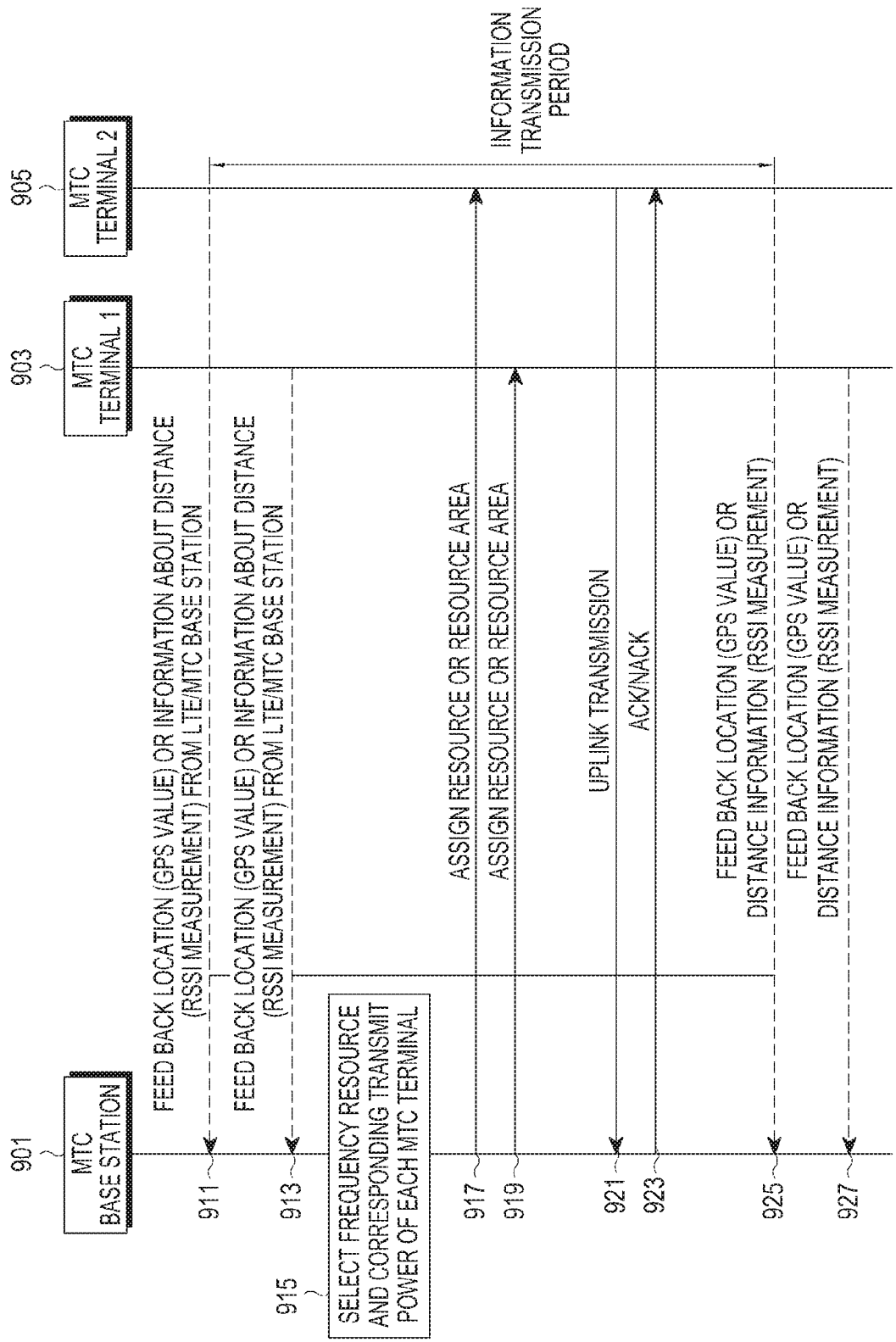
FIG. 9 is a view illustrating signal transmission and reception between a MTC base station and a MTC terminal where base station scheduling is performed according to an embodiment of the present disclosure.

FIG. 9 is a view illustrating signal transmission and reception between a MTC base station and a MTC terminal where base station scheduling is performed according to an embodiment of the present disclosure.

In steps 911 and 913, an MTC terminal 1 903 and a MTC terminal 2 905 send their location information or distance information from base stations. That is, MTC terminal 1 903 and MTC terminal 2 905 may send their location information (GPS information) to the MTC base station 901. Or, as described in connection with FIG. 8, they measure the RS SI of reference signals received from the base stations, calculate path losses based thereon, and send distance information between them and the LTE base station (not shown) and/or MTC base station 901 estimated using the path losses to the MTC base station 901.

The MTC base station 901 determines the transmit frequency resource and/or transmit power for uplink transmission of each MTC terminal 903 and 905 based on the location information or the distance information. That is, base station scheduling is performed.

Thereafter, in steps 917 and 919, scheduling information including uplink transmission resource information scheduled according to the result of the base station scheduling is sent to each MTC terminal 903 and 905. Thus, the information about the uplink transmit resource and/or uplink transmit power is transferred to each terminal.

When MTC terminal 2 905 is assumed to have been scheduled in the scheduling process, MTC terminal 2 905 in step 921 performs uplink transmission through the uplink transmit resource based on the scheduling information. In step 923, the MTC base station 901 sends an ACK/NACK responsive to the uplink transmission to the MTC terminal 2 905.

In subsequent steps 925 and 927, operations subsequent to steps 911 and 913 are repeated as per a preset feedback transmission period of location information or distance information.

Figure 10:
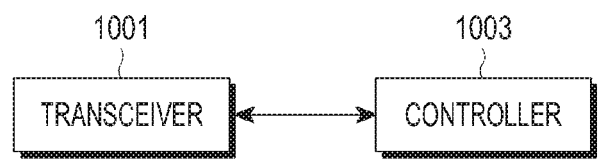
FIG. 10 is a view illustrating a configuration of a terminal device according to an embodiment of the present disclosure.

FIG. 10 is a view illustrating a configuration of a MTC terminal device according to an embodiment of the present disclosure.

The MTC terminal includes a transceiver 1001 and a controller 1003.

The controller 1003 performs the overall operation of the terminal according to the above-described embodiments of the present disclosure. As an example, the controller 1003 receives reference signals from the MTC base station or LTE base stations through the transceiver 1001, determine the distance from each base station, determines a frequency resource and/or transmit power value for uplink transmission, and performs uplink transmission, through the transceiver 1001, using the determined frequency resource and/or transmit power value. Such operations have been described above in detail, and no further description thereof is given.

Figure 11:
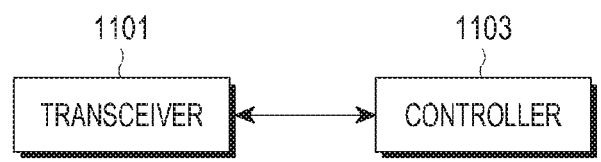
FIG. 11 is a view illustrating a configuration of a base station device according to an embodiment of the present disclosure.

FIG. 11 is a view illustrating a configuration of a base station device according to an embodiment of the present disclosure.

The base station includes a transceiver 1101 and a controller 1103. The base station may be a MTC base station or a LTE base station. The controller 1103 performs the overall operation of the base station according to the above-described embodiments of the present disclosure. That is, it sends a reference signal. Where the base station is a MTC base station, the controller 1103 receives an uplink signal through the transceiver 1101. Further, the base station may perform operations as per base station scheduling as described above in connection with FIG. 9. Other detailed operations of the base station have been described above.

Particular aspects of the present disclosure may be implemented as computer readable codes in a computer readable recording medium. The computer readable recording medium is a data storage device that may store data readable by a computer system. Examples of the computer readable recording medium may include read only memories (ROMs), random access memories (RAMs), CD-ROMs, magnetic tapes, floppy disks, optical data storage devices, and carrier waves (such as data transmission over the Internet). The computer readable recording medium may be distributed by computer systems over a network, and accordingly, the computer readable codes may be stored and executed in a distributed manner Functional programs, codes, and code segments to attain the present disclosure may be readily interpreted by skilled programmers in the art to which the present disclosure pertains.

The apparatuses and methods according to embodiments of the present disclosure may be implemented in hardware, software, or a combination of hardware and software. Such software may be stored in a volatile or non-volatile storage device such as a read-only memory (ROM) or other storage devices, a memory, such as a random access memory (RAM), a memory chip, a device or an integrated circuit, or a storage medium, such as, e.g., a compact disk (CD), a digital video disk (DVD), a magnetic disk, or a magnetic tape, which allows for optical or magnetic recording while simultaneously read out by a machine (e.g., a computer). The methods according to embodiments of the present disclosure may be implemented by a computer or a portable terminal including a controller and a memory, and the memory may be an exemplary machine-readable storage medium that may properly retain program(s) containing instructions for implementing the embodiments of the present disclosure.

Accordingly, the present disclosure encompasses a program containing codes for implementing the device or method set forth in the claims of this disclosure and a machine (e.g., computer)-readable storage medium storing the program. The program may be electronically transferred via any media such as communication signals transmitted through a wired or wireless connection and the present disclosure properly includes the equivalents thereof.

The apparatuses according to embodiments of the present disclosure may receive the program from a program providing device wiredly or wirelessly connected thereto and store the same. The program providing apparatus may include a memory for storing a program including instructions enabling a program processing apparatus to perform a method according to an embodiment of the present disclosure and data necessary for a method according to an embodiment of the present disclosure, a communication unit for performing wired or wireless communication with a graphic processing apparatus, and a controller transmitting the program to the graphic processing apparatus automatically or as requested by the graphic processing apparatus.

Although specific embodiments of the present disclosure have been described above, various changes may be made thereto without departing from the scope of the present disclosure. Thus, the scope of the present disclosure should not be limited to the above-described embodiments, and should rather be defined by the following claims and equivalents thereof.

Although the present disclosure has been described with an exemplary embodiment, various changes and modifications may be suggested to one skilled in the art. It is intended that the present disclosure encompass such changes and modifications as fall within the scope of the appended claims.

The invention claimed is:

1. A method for determining an uplink transmission resource of a wireless communication system, the method comprising:
   obtaining a first distance value between a first base station supporting a first communication system and a terminal supporting the first communication system and a second distance value between a second base station supporting a second communication system and the terminal; and
   determining a first frequency resource for uplink signal transmission of the terminal based on the first distance value and the second distance value,
   wherein the first communication system is a machine-type communication (MTC) communication system, the second communication system is a long term evolution (LTE) communication system, and the terminal is a MTC terminal,
   wherein the first frequency resource is a frequency resource positioned near a second frequency resource being used by the LTE communication system, and
   wherein the first frequency resource and a transmit power are determined by a previously stored table including information on a previously stored frequency resource and transmit power value corresponding to the first distance value and the second distance value.

2. The method of claim 1, wherein the determining comprises:
   in response to a distance between the terminal and the first base station being within a predetermined value, or the terminal being located at an edge of a cell of the first base station, determining a farthest frequency resource among frequency resources, near a second frequency resource being used by the second communication system, as the first frequency resource.

3. The method of claim 1, wherein the determining comprises:
   in response to a distance between the terminal and the first base station being midway between a first reference value or more and a second reference value or less, determining a closest frequency resource among frequency resources, near a second frequency resource being used by the second communication system, as the first frequency resource.

4. The method of claim 1, wherein the frequency resource and the transmit power value are determined by an Equation:

Select $\forall n$ and corresponding $P_{TX,MTC}(n)$ which satisfies $P_{TX,MTC}(n) \leq P_{max,MTC}$ and
$SINR_{MTC}(n) > SINR_{req,MTC}$ where $SINR_{MTC}(n) = f(P_{TX,MTC}(n), PL_{MTC}(d_{MTC}), INT_{LTE-to-MTC}(n), N_0)$ such that $INT_{MTC-to-NearestLTE}(n) < E_{IB}$ and
$INT_{MTC-to-OOB} < E_{OOB}$ wherein: n is an nth possible channel on a frequency axis in a protection band of the second communication system,
$P_{TX,MTC}(n)$ is a transmit power that the MTC terminal uses upon transmission in an nth frequency resource,
$P_{max,MTC}$ is a maximum possible transmit power of the MTC terminal,
$SINR_{MTC}(n)$ is a signal-to-interference-plus-noise ratio (SINR) where the MTC terminal uses the nth frequency resource,
$SINR_{req,MTC}$ is a minimum SINR as required for MTC uplink communication,
$PL_{MTC}(d)$ is a path loss between the first base station and the MTC terminal,
$INT_{LTE-to-MTC}(n)$ is an interference with the MTC terminal by an LTE communication,
$N_0$ is a noise power,
$INT_{MTC-to-LTE}(n)$ is an interference with a nearby LTE transmission band by the MTC uplink communication of the MTC terminal, Erg is an amount of interference permitted for in-band radiation,
$INT_{MTC-to-OOB}$ is an amount of out-of-band radiation by the MTC terminal, and $E_{oOB}$ is the amount of interference permitted for out-of-band radiation.

5. The method of claim 1, wherein the first distance value and the second distance value are measured using a reference signal that the first base station or the second base station sends through a predetermined resource of a guard band of the second communication system, measured using a reference signal that the first base station or the second base station sends through a predetermined resource of a main band used for communication of the second communication system, or measured by receiving global positioning satellite (GPS) information of the first base station or the second base station.

6. The method of claim 1, wherein the method is performed by the terminal or the second base station.

7. An apparatus for determining an uplink transmission resource of a wireless communication system, the apparatus comprising:
   a transceiver; a processor configured to:
   control the transceiver to obtain a first distance value between a first base station supporting a first communication system and a terminal supporting the first communication system and a second distance value between a second base station supporting a second communication system and the terminal; and
   determine a first frequency resource for uplink signal transmission of the terminal based on the first distance value and the second distance value,
   wherein the first communication system is a machine-type communication (MTC) communication system, the second communication system is a long term evolution (LTE) communication system, and the terminal is a MTC terminal,
   wherein the first frequency resource is a frequency resource positioned near a second frequency resource being used by the LTE communication system, and
   wherein the first frequency resource and a transmit power are determined by a previously stored table including information on a previously stored frequency resource and transmit power value corresponding to the first distance value and the second distance value.

8. The apparatus of claim 7, wherein the processor is configured to, if a distance between the terminal and the first base station is within a predetermined value, or the terminal is located at an edge of a cell of the first base station, determine a farthest frequency resource among frequency resources, near a second frequency resource being used by the second communication system, as the first frequency resource.

9. The apparatus of claim 7, wherein the processor is configured to, if a distance between the terminal and the first base station is midway between a first reference value or more and a second reference value or less, determine a closest frequency resource among frequency resources, near a second frequency resource being used by the second communication system, as the first frequency resource.

10. The apparatus of claim 7, wherein the frequency resource and the transmit power value are determined by an Equation:

$$\text{Select } \forall n \text{ and corresponding } P_{TX,MTC}(n)$$

$$\text{which satisfies } P_{TX,MTC}(n) \leq P_{max,MTC} \text{ and } \text{SINR}_{MTC}(n) > \text{SINR}_{req,MTC}$$

$$\text{where } \text{SINR}_{MTC}(n) = f(P_{TX,MTC}(n), PL_{MTC}(d_{MTC}), \text{INT}_{LTE\text{-}to\text{-}MTC}(n), N_0)$$

$$\text{such that } \text{INT}_{MTC\text{-}to\text{-}NearestLTE}(n) < E_{IB} \text{ and } \text{INT}_{MTC\text{-}to\text{-}OOB} < E_{OOB}$$

wherein: n is an nth possible channel on a frequency axis in a protection band of the second communication system, $P_{TX,MTC}(n)$ is a transmit power that the MTC terminal uses upon transmission in an nth frequency resource, $P_{max,MTC}$ is a maximum possible transmit power of the MTC terminal, $\text{SINR}_{MTC}(n)$ is a signal-to-interference-plus-noise ratio (SINR) where the MTC terminal uses the nth frequency resource, $\text{SINR}_{req,MTC}$ is a minimum SINR as required for MTC uplink communication, $PL_{MTC}(d)$ is a path loss between the first base station and the MTC terminal, $\text{INT}_{LTE\text{-}to\text{-}MTC}(n)$ is an interference with the MTC terminal by an LTE communication, $N_0$ is a noise power, $\text{INT}_{MTC\text{-}to\text{-}LTE}(n)$ is an interference with a nearby LTE transmission band by the MTC uplink communication of the MTC terminal, $E_{rg}$ is an amount of interference permitted for in-band radiation, $\text{INT}_{MTC\text{-}to\text{-}OOB}$ is an amount of out-of-band radiation by the MTC terminal, and $E_{ooB}$ is the amount of interference permitted for out-of-band radiation.

11. The apparatus of claim 7, wherein the apparatus is the terminal or the second base station.

12. The apparatus of claim 7, wherein the first distance value and the second distance value are measured using a reference signal that the first base station or the second base station sends through a predetermined resource of a guard band of the second communication system, measured using a reference signal that the first base station or the second base station sends through a predetermined resource of a main band used for communication of the second communication system, or measured by receiving global positioning satellite (GPS) information of the first base station or the second base station.

* * * * *